US008152073B2

(12) United States Patent
Williams

(10) Patent No.: US 8,152,073 B2
(45) Date of Patent: Apr. 10, 2012

(54) METHOD AND APPARATUS FOR THE DETECTION OF COUNTERFEITING

(75) Inventor: James R Williams, Keene, NH (US)

(73) Assignee: Polyonics, Inc., Westmoreland, NH (US)

( * ) Notice: Subject to any disclaimer, the term of this patent is extended or adjusted under 35 U.S.C. 154(b) by 363 days.

(21) Appl. No.: 12/432,987

(22) Filed: Apr. 30, 2009

(65) Prior Publication Data

US 2009/0273177 A1 Nov. 5, 2009

Related U.S. Application Data

(60) Provisional application No. 61/049,126, filed on Apr. 30, 2008.

(51) Int. Cl.
*G06K 19/02* (2006.01)

(52) U.S. Cl. ......................... 235/488; 235/375; 235/487

(58) Field of Classification Search .................. 235/488, 235/487, 375, 491
See application file for complete search history.

(56) References Cited

U.S. PATENT DOCUMENTS

| | | | |
|---|---|---|---|
| 1,689,302 | A | 10/1928 | Smith |
| 5,506,016 | A | 4/1996 | Onodera et al. |
| 5,578,365 | A | 11/1996 | Kume et al. |
| 5,789,019 | A | 8/1998 | Vigano |
| 5,873,604 | A | 2/1999 | Phillips |
| 6,245,711 | B1 | 6/2001 | Halbrook, Jr. |
| 6,786,954 | B1 | 9/2004 | Lee et al. |
| 6,850,626 | B2 | 2/2005 | Rhoads et al. |
| 7,063,264 | B2 | 6/2006 | Bi et al. |
| 7,266,527 | B1 | 9/2007 | Martin |
| 2002/0184152 | A1 | 12/2002 | Martin |
| 2003/0173406 | A1 | 9/2003 | Bi et al. |
| 2004/0013285 | A1 | 1/2004 | Jordan et al. |
| 2006/0071468 | A1 | 4/2006 | Marsden |

FOREIGN PATENT DOCUMENTS

| | | | |
|---|---|---|---|
| EP | 0 693 383 A2 | A1 | 1/1996 |
| EP | 0 695 439 | B1 | 10/1997 |
| EP | 0 878 781 | A2 | 11/1998 |
| EP | 0927749 | A1 | 7/1999 |
| GB | 1 507 454 | | 4/1978 |
| GB | 2 383 012 | A | 6/2003 |
| KR | 10-2004-0053204 | A | 7/2004 |
| KR | 10-2007-0110201 | A | 11/2007 |
| WO | 93/07844 | A1 | 4/1993 |
| WO | 93/12416 | A1 | 6/1993 |
| WO | 94/24614 | A1 | 10/1994 |
| WO | 97/31784 | A2 | 9/1997 |
| WO | 00/77104 | A1 | 12/2000 |
| WO | 03/030129 | A2 | 4/2003 |
| WO | 03/043814 | A1 | 5/2003 |
| WO | 03/056500 | A1 | 7/2003 |
| WO | 2004/047032 | A1 | 6/2004 |

OTHER PUBLICATIONS

PCT Search Report dated Nov. 2, 2009 of Patent Application No. PCT/US2009/042225 filed Apr. 30, 2009.

*Primary Examiner* — Edwyn Labaze
(74) *Attorney, Agent, or Firm* — Maine Cernota & Rardin

(57) ABSTRACT

A system is provided for counterfeiting countermeasures, the system comprising: a first authenticity indicator disposed in a print substrate coating; a second authenticity indicator disposed in a print generating matrix; a print pattern comprising the print generating matrix disposed upon the print substrate coating; a detector configured to detect the first and the second authenticity indicators in a portion of the print pattern within the field of the detector.

17 Claims, 3 Drawing Sheets

METHOD AND APPARATUS FOR THE DETECTION OF COUNTERFEITING

RELATED APPLICATIONS

This application claims the benefit of U.S. Provisional Applications No. 61/049,126, filed Apr. 30, 2008. This application is herein incorporated by reference in its entirety for all purposes.

FIELD OF THE INVENTION

The invention relates to document and product authentication systems, and more particularly, to a system for the authentication of a document or product having first and second indicators disposed therein detectable by a pre-programmed detector.

BACKGROUND OF THE INVENTION

Historically, counterfeiting has mainly related to pieces of paper and documents that had a value, such as currency, checks or bonds and also Passports. During the 1990's, counterfeiting spread to pieces of plastic that have a value, such as credit cards or debit cards. Today however, counterfeiting has significantly extended beyond these boundaries into the illegal copying and selling of all kinds of branded goods. Such counterfeit branded products are generally offered together with all the associated labeling and packaging of those goods, so as to make the goods appear as if they were genuinely produced under the legal trade mark of a reputable brand owner.

Many different means of security are available to prevent duplication of packaging films or labels, using special additives, such as taggants, dyes, planchettes, pigments, phosphors, holograms, optically variable devices, special inks (fluorescent inks and other optically variable inks) or printed images that change color. Making alterations to data on packaging and labels is today a well established method that is used to disguise origin, sell-by-dates and product tracking data.

The tracking and tracing of products through the supply chain is usually achieved by means of a label or packaging markings, typically applied by laser, ink jet, hot stamp printing, flexographic, digital, and thermal transfer, and hot stamp printing. This automation of the supply chain brings with it the added threats of alteration or forgery, such as making alterations to data on packaging and labels (so as to change their value). Such forgeries are used to disguise origin, sell-by-dates and product tracking data in order to mask out of date products or make it difficult to identify stolen or diverted goods.

What is needed, therefore, are techniques for authentication of genuine products or packages.

SUMMARY OF THE INVENTION

One embodiment of the present invention provides a system for counterfeiting countermeasures, the system comprising: a first authenticity indicator disposed in a print substrate coating; a second authenticity indicator disposed in a print generating matrix; a print pattern comprising the print generating matrix disposed upon the print substrate coating; a detector configured to detect the first and the second authenticity indicators in a portion of the print pattern within the field of the detector.

Another embodiment of the present invention provides such a system wherein the first and the second authenticity indicators are taggants.

A further embodiment of the present invention provides such a system wherein the taggants are infrared identifiable.

Still another embodiment of the present invention provides such a system wherein the detector is a hand held detector.

A still further embodiment of the present invention provides such a system further comprising an adhesive substrate upon which is disposed the print substrate coating.

Yet another embodiment of the present invention provides such a system wherein the first and second authenticity indicators comprise first and second distinguishable taggants.

A yet further embodiment of the present invention provides such a system wherein each of the first and second distinguishable taggants comprises crystals of layered optically identifiable strata.

Even another embodiment of the present invention provides such a system wherein first and second distinguishable taggants are selected from the group of taggants consisting of phosphors, dyes, pigments and combinations thereof.

An even further embodiment of the present invention provides such a system wherein the substrate comprises a substrate configured from a substrate material selected from the group of substrate materials consisting of plastic, paper, or metal.

Still yet another embodiment of the present invention provides such a system wherein the first authenticity indicator is different from the second authenticity indicator.

A still yet further embodiment of the present invention provides such a system wherein the first authenticity indicator comprises a anti-Stokes Raman up converter.

Still even another embodiment of the present invention provides such a system wherein the second authenticity indicator comprises a anti-Stokes Raman up converter.

One embodiment of the present invention provides a method of certifying the authenticity of a printed pattern, the method comprising: providing a substrate coating layer having a first authenticity indicator disposed therein; applying a pattern to the substrate coating layer, the pattern comprising a second authenticity indicator disposed within a matrix; applying a detector to a the pattern, the detector being a preprogrammed detector configured to detect threshold levels of the first and second authenticity indicators, and providing an output indicating the presence of the first and the second authenticity indicators.

Another embodiment of the present invention provides such a method further comprising the step of calibrating the detector by analyzing a region of the printed pattern wherein either the first or the second authenticity indicator is absent.

A further embodiment of the present invention provides such a method wherein the first authenticity indicator is distinguishable from the second authenticity indicator.

Still another embodiment of the present invention provides such a method wherein the first and second authenticity indicators are taggants, selected from the group of taggants consisting of layered crystalline taggants, phosphors, pigments, and dyes.

A still further embodiment of the present invention provides such a method wherein different first and second authenticity indicators are present in different amounts.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1:
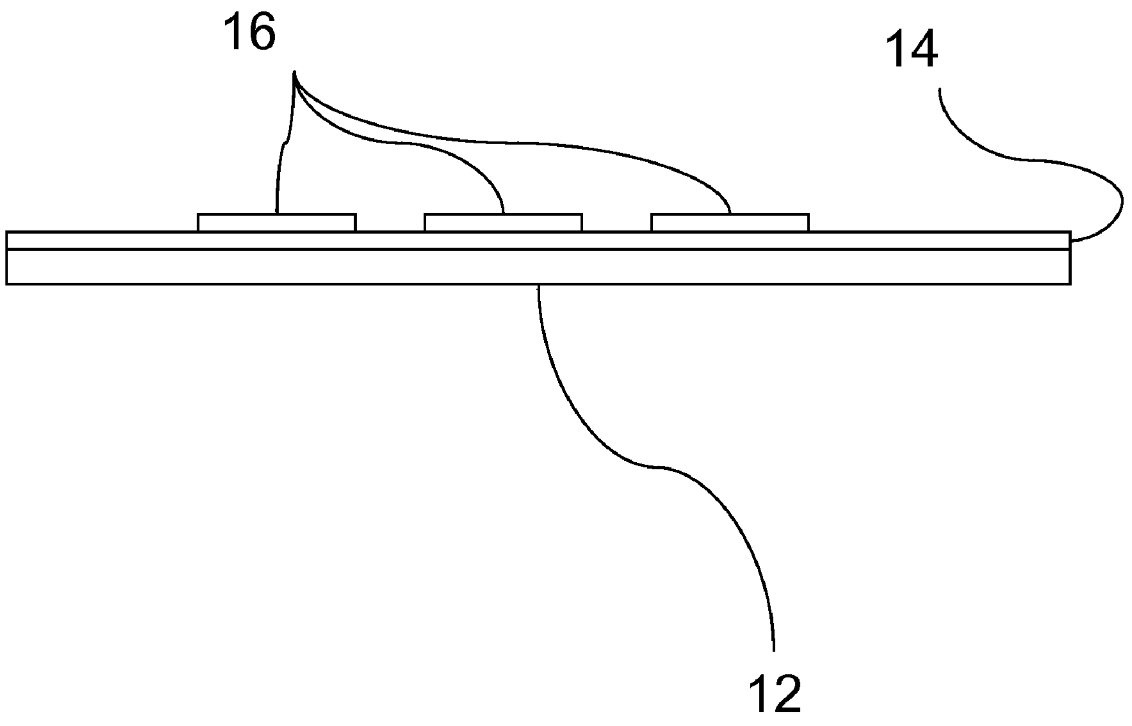
FIG. 1 is an elevation view illustrating a system for counterfeiting countermeasures configured in accordance with one embodiment of the present invention.

One embodiment of the present invention, as illustrated in FIG. 1, provides a system for the manufacture of counterfeit resistant labeling 10. In such an embodiment, a substrate 14 is provided within which or upon which is disposed a counterfeit preventing or alteration evident indicator. In one embodiment, this substrate 14 may be plastic, paper, or foil. In one such embodiment, a marking material 16, such as an ink or ink ribbon, further comprising a second counterfeit printing or alteration evident indicator, as a security feature is used in combination with the substrate 14. A text or design printed with the marking material 16 on the substrate 14 would contain both indicators. One skilled in the art would appreciate that additional indicators could be introduced into the system to increase the complexity of the counterfeiting countermeasure system, further securing the system. In one embodiment of the present invention, the authenticity indicators used are taggants. In some embodiments, these taggants may be spectroscopic or infrared readable taggants, either phosphors, up changers, pigments or dyes, while one skilled in the art will appreciate that other alternative embodiments may employ taggants tuned to various light wavelengths. Absorption, florescence, phosphorescence of the taggant may each be used in various embodiments as a suitable property for identification of the taggant. Alternatively, magnetic taggants may be utilized.

Figure 2:
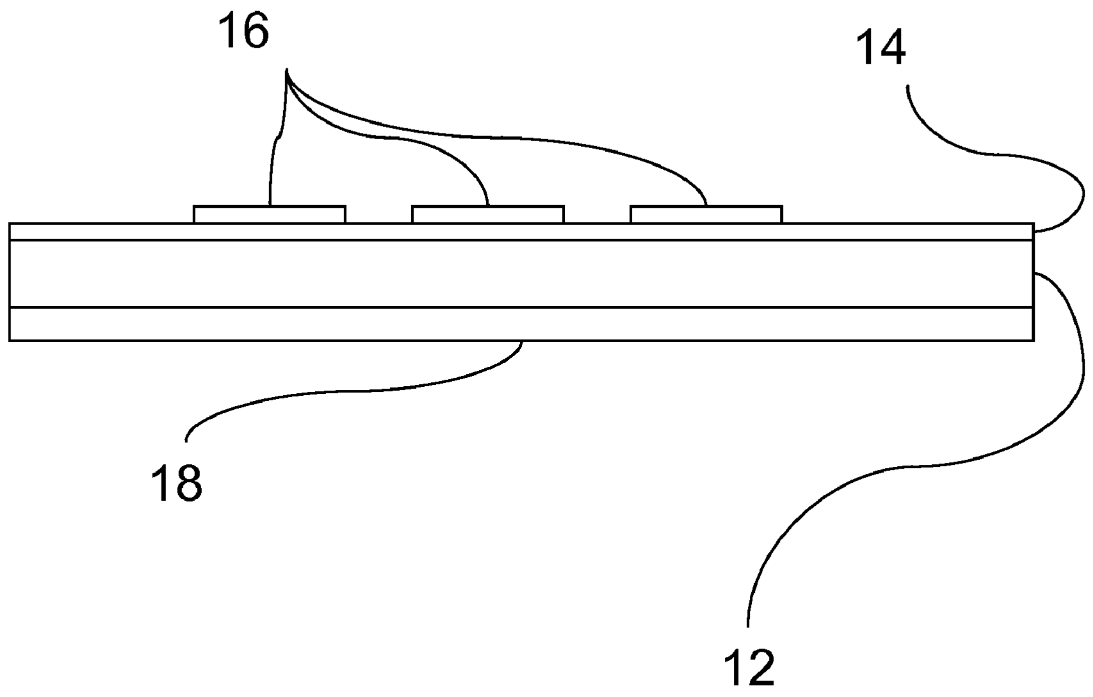
FIG. 2 is an elevation view illustrating a system for counterfeiting countermeasures configured in accordance with one embodiment of the present invention and having an adhesive substrate.

In an alternative embodiment illustrated in FIG. 2, a filmic or paper pressure sensitive label may be utilized as a substrate 14, or an adhesive 18 may be applied to a plastic or polymeric substrate 14. Such an embodiment would facilitate preprinting of the labels to allow anti-counterfeiting labels to be adhered to, documents, packages and products for ensuring authenticity thereof.

Figure 3:
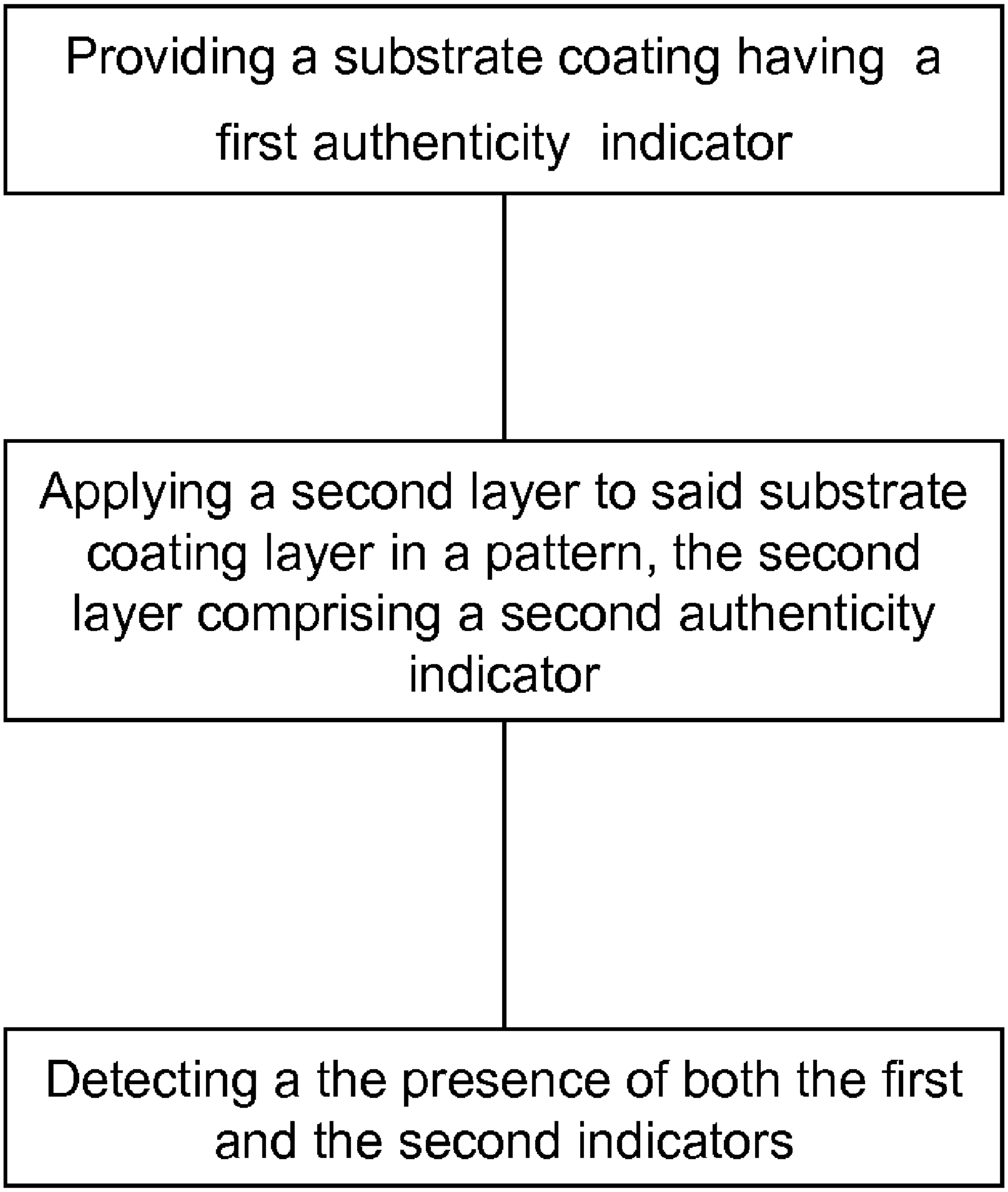
FIG. 3 is a flow chart illustrating a method for counterfeiting countermeasures configured in accordance with one embodiment of the present invention.

In one embodiment, illustrated in the flowchart of FIG. 3, a printing process is provided whereby the marking indicator is introduced to a second layer, in one embodiment, ink. The ink is then printed onto the surface of a packaging plastic film or pressure sensitive label. A print pattern is created, such that when the printed area is tested a region of the pattern contains both first and second indicators in detectable concentrations. The concentration or proportion of each indicator required by the detector to be simultaneously visible to the detection means may vary, depending on the detection system employed.

Various embodiments of the present invention provide a detector configured to individually detect and identify desired indicators. Such a detection device may be configured to detect the indicators simultaneously in a programmable and defined ratio. If the device only detects one of the two markers, while a printed area containing both markers is scanned, it will register an error condition. According to one embodiment of the present invention, a sensor is provided configured to detect the presence of both indicators simultaneously in a given area. The indicators may overlap or be separate. Further, the sensor may be calibrated by applying it to areas with only one of the taggants is present. The sensor is pre-programmed to detect concentration of taggants that are over certain minimum concentration, or that are within a window of potential concentrations. Only where both indictors are present in appropriate concentrations will the sensor alert to a genuine article. In the absence of one or both of the indicators, either no alert will be given, or a negative alert will be given. The sensor or detector may be configured from an optical sensor, a light source with at least one wavelength appropriate to the indicators, and other components known to those skilled in the art.

As illustrated in FIG. 1, an ink receptive substrate layer 14 may be coated onto the filmic or paper substrate 12 by any of several coating methods known to those of ordinary skill in the art. The coating 14 may be applied such that it covers the entire surface of the substrate 12. This would result in one of the indicators being used across the entire length and breadth of the substrate surface 14.

Alternatively, the coating may be applied only in specific locations on the filmic or paper substrate 12, to provide areas of printing receptivity on discrete positions on the substrate surface. These print receptive areas would then be printed with the ink materials in registration with them such that the printed image 16 will be printed upon the surface of the print receptive area 14. This enables both authenticity indicators to be detected simultaneously.

As illustrated in FIG. 2, ink receptive substrates can comprise a base sheet or layer 12, and an ink receptive coating 14 on at least one surface of the base substrate 12, along with a pressure sensitive adhesive adhered on the side opposite the coated film or paper surface. Adhesives used may include adhesives know to those skilled in the art and suited to specific applications.

Print patterns employed may include bar codes, mosaic patterns or other patterns where ratios of print and exposed substrate are preconfigured to provide appropriate exposure to the detector. In one embodiment, first and second indications may be present in first and second layers, respectively, the layers being disposed one on top of the other. In such an embodiment, such layers may be transparent, partially opaque, or opaque at the detector wavelength. In an alternative embodiment, a layer may be opaque in the visible spectrum, but transparent at the detector wavelength.

In one embodiment of the present invention, a holographic image may be utilized as the substrate. A substrate covering layer of transparent lacquer containing a first authenticity indicator may be applied. A second transparent layer of lacquer may be applied to the substrate layer, where the holographic image is still visible to the observer, while the indicators disposed in the first and second lacquer layers are detectable by a sensor. On skilled in the art will appreciate that other art or designs may be disposed beneath taggant doped layers, as such designs would not interfere with the detection of dopants. One skilled in the art will appreciate that additional layers of taggant doped layers may be applied, such that the signature of the pattern is of increased complexity.

One embodiment of the present invention provides a system for counterfeiting countermeasures, the system comprising: a first authenticity indicator disposed in a print substrate coating; a second authenticity indicator disposed in a print generating matrix; a print pattern comprising the print generating matrix disposed upon the print substrate coating; a detector configured to detect the first and the second authenticity indicators in a portion of the print pattern within the field of the detector.

One embodiment of the present invention provides such a system wherein the first and the second authenticity indicators are taggants. Taggants may be infrared identifiable, and distinguishable in different authenticating indicators. Taggants may comprise crystals of layered optically identifiable strata, phosphors, pigments, dyes, up converters (such as anti-Stokes Raman up-converters) and combinations thereof.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, nor by the exemplary claims appended hereto.

What is claimed is:

1. A system for counterfeiting countermeasures, the system comprising:

a first authenticity indicator disposed in a print substrate coating at a concentration within a preprogrammed window of first authenticity indicator concentrations;

a second authenticity indicator disposed in a print generating matrix at a concentration within a preprogrammed window of second authenticity indicator concentrations;

a print pattern comprising said print generating matrix disposed upon said print substrate coating;

a detector configured to detect said first and said second authenticity indicators in a portion of said print pattern within the field of the detector and to determine if both said first authenticity indicator is at said concentration within said preprogrammed window of first authenticity indicator concentrations and said second authenticity indicator is at said concentration within said preprogrammed window of second authenticity indicator concentrations.

2. The system of claim 1 wherein said first and said second authenticity indicators are taggants.

3. The system according to claim 2 wherein said taggants are infrared identifiable.

4. The system according to claim 1 wherein said detector is a hand held detector.

5. The system according to claim 1 further comprising an adhesive substrate upon which is disposed said print substrate coating.

6. The system according to claim 1 wherein said first and second authenticity indicators comprise first and second distinguishable taggants.

7. The system according to claim 6 wherein each of said first and second distinguishable taggants comprises crystals of layered optically identifiable strata.

8. The system according to claim 6 wherein first and second distinguishable taggants are selected from the group of taggants consisting of phosphors, pigments, dyes and combinations thereof.

9. The system according to claim 1 wherein said substrate comprises a substrate configured from a substrate material selected from the group of substrate materials consisting of plastic, paper, or metal.

10. The system according to claim 1 wherein said first authenticity indicator is different from said second authenticity indicator.

11. The system according to claim 1 wherein said first authenticity indicator comprises a anti-Stokes Raman up converter.

12. The system according to claim 1 wherein said second authenticity indicator comprises a anti-Stokes Raman up converter.

13. The method of certifying the authenticity of a printed pattern, said method comprising:

providing a substrate coating layer having a first authenticity indicator disposed therein;

applying a pattern to said substrate coating layer, said pattern comprising a second authenticity indicator disposed within a matrix;

applying a detector to a said pattern, said detector being a preprogrammed detector configured to detect preprogrammed threshold levels of said first and second authenticity indicators, and providing an output indicating the presence of said first and said second authenticity indicators.

14. The method according to claim 13 further comprising the step of calibrating said detector by analyzing a region of said printed pattern wherein either said first or said second authenticity indicator is absent.

15. The method according to claim 13 wherein said first authenticity indicator is distinguishable from said second authenticity indicator.

16. The method according to claim 13 wherein said first and second authenticity indicators are taggants, selected from the group of taggants consisting of layered crystalline taggants, phosphors, pigments, and dyes.

17. The method according to claim 10 wherein different first and second authenticity indicators are present in different amounts.

* * * * *